United States Patent
Damm et al.

(10) Patent No.: US 8,085,674 B2
(45) Date of Patent: Dec. 27, 2011

(54) PRIORITY TRACE IN DATA NETWORKS

(75) Inventors: Gerard Damm, Plano, TX (US); Hakki C. Cankaya, Dallas, TX (US); Timucin Ozugur, Fairview, TX (US)

(73) Assignee: Alcatel Lucent, Paris (FR)

( * ) Notice: Subject to any disclaimer, the term of this patent is extended or adjusted under 35 U.S.C. 154(b) by 1281 days.

(21) Appl. No.: 11/786,366

(22) Filed: Apr. 11, 2007

(65) Prior Publication Data

US 2008/0253299 A1    Oct. 16, 2008

(51) Int. Cl.
*H04L 12/26* (2006.01)

(52) U.S. Cl. ............ 370/241.1; 370/242; 370/248; 370/230

(58) Field of Classification Search .......... 370/229, 370/230, 241, 1, 242, 248
See application file for complete search history.

(56) References Cited

U.S. PATENT DOCUMENTS

| | | | |
|---|---|---|---|
| 6,975,639 B1* | 12/2005 | Hill et al. | 370/412 |
| 2003/0152028 A1* | 8/2003 | Raisanen et al. | 370/235 |
| 2003/0198220 A1* | 10/2003 | Gross et al. | 370/389 |
| 2007/0133549 A1* | 6/2007 | Lee et al. | 370/392 |
| 2008/0159287 A1* | 7/2008 | Nagarajan et al. | 370/392 |

* cited by examiner

*Primary Examiner* — Hassan Kizou
*Assistant Examiner* — Siming Liu
(74) *Attorney, Agent, or Firm* — Garlick Harrison & Markison; Holly L. Rudnick

(57) ABSTRACT

A diagnostic tool for identifying priority errors within a data network is realized using a priority trace data packet. The priority trace data packet is originated at an originating node of interest and terminated at a terminating node of interest. At various intermediate network nodes along the data path between the originating and terminating nodes, the priority trace packet is inspected to determine the current priority value of the priority trace packet. The current priority value is stored in a priority trace field that can be analyzed by a network management node to identify one or more sources of priority errors.

27 Claims, 6 Drawing Sheets

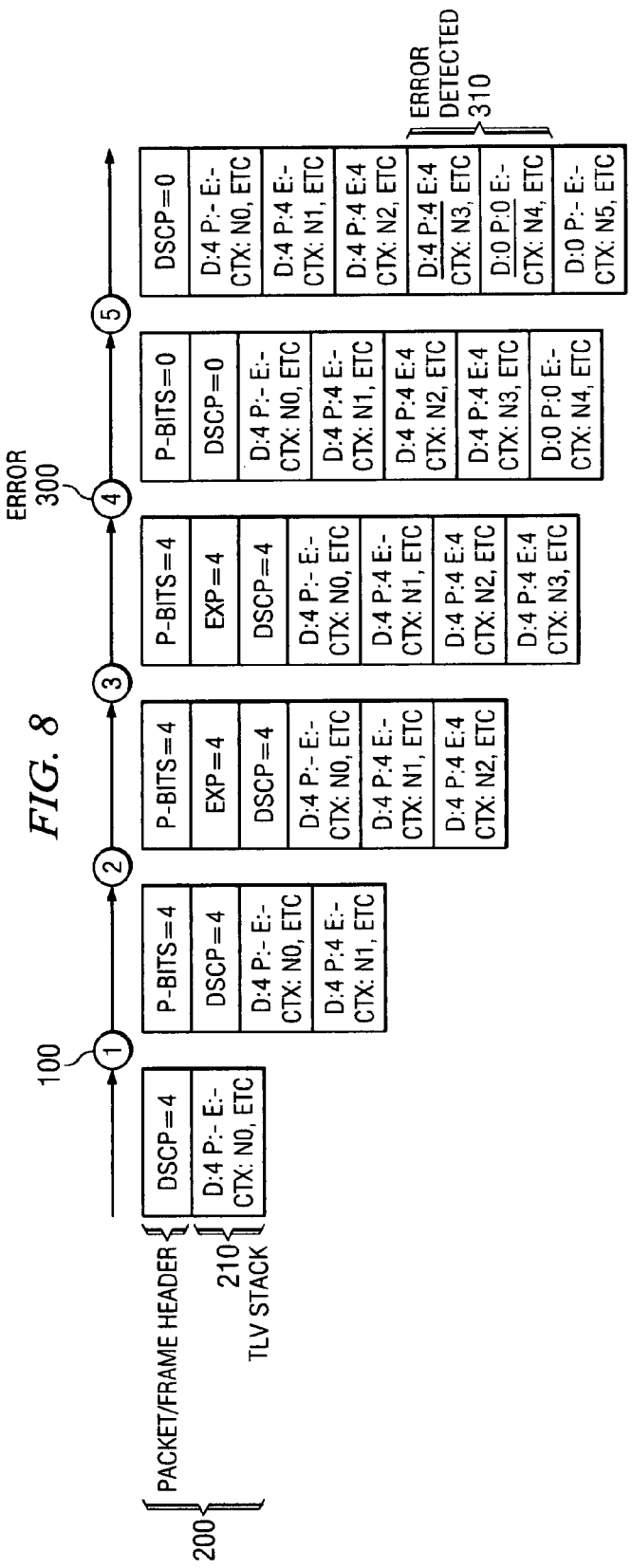

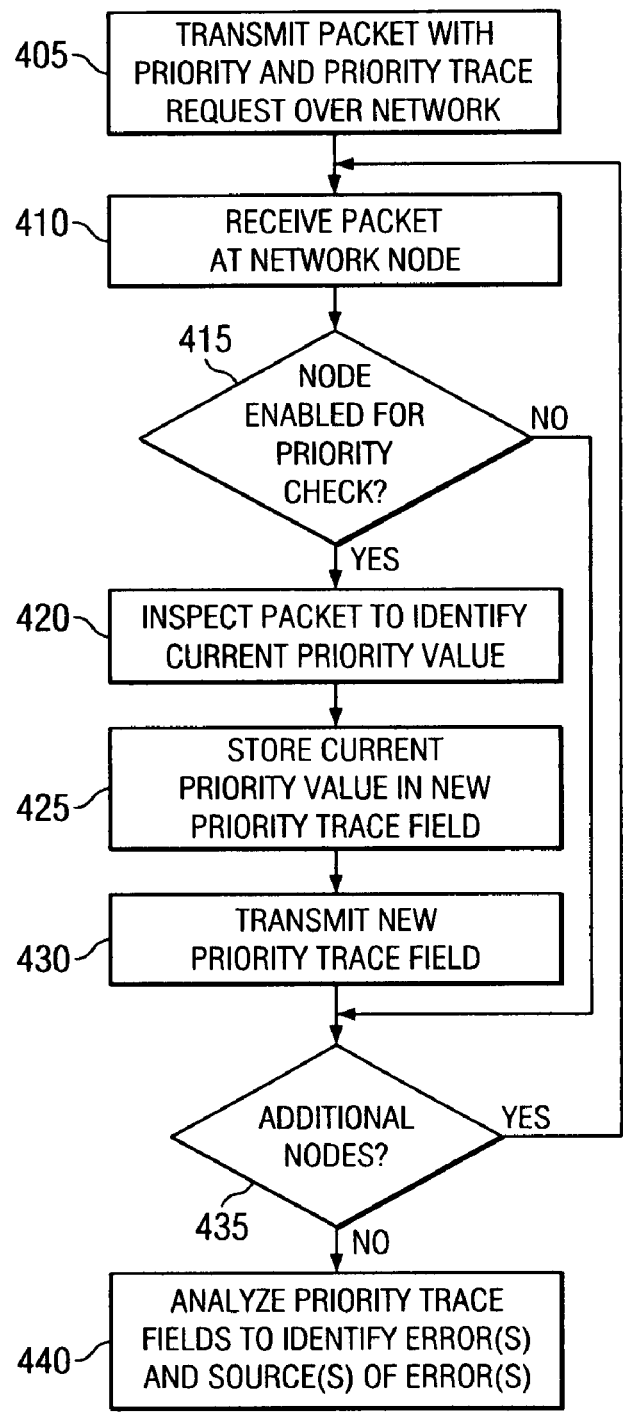

PRIORITY TRACE IN DATA NETWORKS

BACKGROUND OF THE INVENTION

1. Technical Field of the Invention

The present invention relates in general to data networks, and in particular, to managing traffic priority in data networks.

2. Description of Related Art

When configuring a data network, a network administrator needs to be able to guarantee a certain Quality of Service (QoS) for customers as outlined in Service Level Agreements (SLAs) with those customers. To enforce a particular QoS, a separate priority is assigned to each class of traffic, and depending on the assigned priority, different processing may be performed on that traffic. Normally, higher priority traffic is expected to perform better in terms of bandwidth, loss, delay, delay variation, and other traffic parameters, which in turn results in a higher price billed to the customer.

The priority assigned to traffic is indicated in the headers of corresponding layers of that traffic. For example, in the header of an Internet Protocol (IP) packet, the traffic priority is indicated in the DiffServ Code Point (DSCP) field, in the header of an MPLS packet, the traffic priority is indicated in the EXPerimental (EXP) field and in the header of an Ethernet packet, the traffic priority is indicated by the p-bits or Priority Code Point (PCP) in Ethernet VLAN tags (802.1Q).

Initial traffic priority settings are performed at network ingress points. However, the initial priority setting may change during transport when a certain traffic priority class is multiplexed with other priority traffic flows. In addition, each network node within the network is configured to maintain or modify the priorities within a layer (intra-layer remarking or regeneration), and in the case of encapsulation/termination, to map the priorities between layers (inter-layer mapping). However, when a particular network layer (e.g., IP) is encapsulated in another layer (e.g., Ethernet) with its own designated priority, the priority of the outer layer may not match the payload priority of the original network layer (e.g., IP).

Initial priority configuration of network nodes is currently performed either manually by Network Management System (NMS) commands, by executing NMS rules (for instance, from a policy server) that automatically issue out-of-band commands, or by using network control protocols, e.g., when a virtual circuit, such as an MPLS LSP, is provisioned with CR-LDP or RSVP-TE. All of these initial priority configuration methods are subject to errors and mistakes, some with immediate effects and some only with latent effects.

Priority misconfigurations can also occur after the network node becomes operational. For example, during a routine check of the network node, the network administrator may type a wrong command that may not even be directed to priorities, which can cause a misconfiguration of the priority handling. As another example, if traffic is reorganized (for instance, a new Deep Packet Inspection capability is introduced in the nodes, and as a consequence, traffic classes can be classified with a finer granularity than previously, and priorities are to be mapped and converted differently), there may be a lot of intended priority handling changes, thus causing many opportunities for configuration errors. In addition, SLS and SLA updates may create the same opportunities for configuration errors.

As yet another example, if separate datapath tables are used and copied from the Management Information Base (MIB), their content may be different due to errors that may have occurred in the copy process from MIB to datapath memory. In addition, a line card could go down, then reboot, and fail to update certain datapath tables. Such an error could go unnoticed for an extended period of time. Likewise, memory overwrites as a result of poor resource allocation for different forwarding instances (e.g. VPLS case) may also go unnoticed until limits are reached for resources.

As a further example, if certain priorities are wrongly configured at certain nodes in the network, the network could still be operational, but certain classes of traffic may get better or worse treatment than intended. If the network is rarely or never saturated, premium traffic receiving only best-effort priority would not be noticed until congestion occurs in the network, suddenly exposing the problem. Likewise, low-priority traffic (e.g., residential user High Speed Internet service) could wrongly receive high-priority due to a single misconfiguration along the path, and peer-to-peer file downloads could end up monopolizing the bandwidth in the network. Moreover, if a customer subscribes to a higher priority service but the operator fails to reconfigure his/her RGW correctly, then the RGW could start marking new packets with wrong priority values, which would not be modified since the RGW is an operator-managed ingress node, trusted by the rest of the network.

With all of the potential ways in which priority settings can be misconfigured, a network operator typically must verify that the priority handling in the network nodes is set correctly and performs as expected, so that contractual SLAs can be satisfactorily delivered to the customers. Priority settings are currently verified by out-of-band queries, which return values from the node MIBs (Management Information Bases). However, out-of-band queries can miss datapath-related problems, since an out-of-band query only verifies the MIB content and not the datapath path tables copied into memory from the MIB in the network node.

In addition, in cases where an error occurs in the RGW, out-of-band queries not reaching the RGW may show that the priority configuration is correct in the rest of the network. Therefore a per-customer, per-service end-to-end check (reaching the RGW) would be desirable for the network operator to handle any customer complaints. Unfortunately, tracking a particular path with an out-of-band method can be tedious if many nodes are involved, since the network operator needs to log onto each node, and a separate command is necessary for each network layer processed by that node. In addition, in many cases, the network operator may not know the exact trajectory of the data path. Furthermore, the nodes along a data path may be managed by different network management systems, not necessarily integrated in the Operations Center, which makes the per-node logging process even more difficult for an administrator.

Therefore, what is needed is an in-band query method that can travel the actual data path and experience and collect all priority-related remarkings and mappings along the data path.

SUMMARY OF THE INVENTION

Embodiments of the present invention provide a priority trace data packet having an origination address identifying an originating node within a data network that originated the priority trace data packet and a destination address identifying a terminating node within the data network. The priority trace data packet further includes a priority field containing an initial priority value assigned to the priority trace data packet and a payload for collecting and maintaining priority information that indicates respective actual priority values assigned to the priority trace data packet by each priority trace enabled network node within the data network that is in a data path between the originating node and the terminating node.

In one embodiment, the priority information includes one or more of Ethernet P-bits, Internet Protocol (IP) DSCP bits and MPLS EXP bits. In an exemplary embodiment, the priority trace data packet is an Operations, Administration and Maintenance (OAM) packet and the payload includes one or more Type, Length, Value (TLV) fields appended to the priority trace data packet, each containing one of the actual priority values assigned to the priority trace data packet by the respective priority trace enabled network node.

In yet another embodiment, the priority trace data packet is an original priority trace data packet, and the payload further includes control information containing both a full indicator indicating whether the original priority trace data packet is full and an original sequence number associated with the original priority trace data packet identifying the original priority trace packet within a sequence of priority trace data packets that collectively contain the priority information for the original priority trace data packet. In an exemplary embodiment, the full indicator is set to full when a size of the original priority trace data packet is substantially equal to a maximum transmission unit (MTU) associated with the original priority trace data packet. In another exemplary embodiment, the control information enables the generation of a subsequent priority trace data packet upon the indication that the original priority data packet is full and the assignment of a subsequent sequence number following the original sequence number to the subsequent priority trace data packet.

In still a further embodiment, the payload further includes a context field for collecting and maintaining context information associated with the data path. In addition, the payload further includes a processing field for collecting and maintaining processing information indicating the processing experienced by the priority trace data packet at each priority trace enabled network node.

Embodiments of the present invention further provide a network node within a data network having an ingress port, a controller and an egress port. The ingress port is coupled to the data network to receive a priority trace data packet originated at an originating node of interest in the data network and terminated at a terminating node of interest in the data network, in which the priority trace data packet has a priority field including a current priority value. The controller processes the priority trace data packet to determine a new priority value for the priority trace data packet and priority information associated with the priority trace data packet, in which the priority information includes the current priority value. The controller further produces a priority trace field including the priority information. The egress port is coupled to the data network for transmission by the data network of the priority trace field to a network management node for use thereof in identifying priority errors within the data network.

In one embodiment, the controller populates the new priority value within the priority field to produce a modified priority trace data packet and appends the priority trace field thereto for transmission thereof by the egress port over the data network to one or more additional network nodes prior to transmission of the priority trace field to the network management node.

In a further embodiment, the priority trace data packet includes one or more additional priority trace fields appended thereto, each containing respective priority information including respective actual priority values assigned to the priority trace data packet by other network nodes within the data network that previously received the priority trace data packet, and the modified priority trace data packet includes the priority trace field appended to the additional priority trace fields.

In another embodiment, the controller encapsulates the priority trace field into an additional data packet having a destination address associated with the network management node for transmission thereof by the egress port to the network management node. In still another embodiment, the controller generates a response message to the originating node and transmits the priority trace field within the response message to the originating node via the egress port for subsequent transmission of the priority trace field by the originating node to the network management node.

In yet another embodiment, the priority trace data packet includes two or more different layers and the current priority value is associated with a first one of the two or more different layers of the priority trace packet. The controller inspects the priority trace data packet to identify one or more additional current priority values, each associated with another one of the two or more different layers and includes the additional current priority values within the priority information.

In still a further embodiment, the priority trace data packet includes two or more different layers, the current priority value is associated with a first one of the two or more different layers of the priority trace packet and each of the two or more different layers is carried by a different transport protocol. The controller interworks between the different transport protocols associated with the different layers to retrieve one or more additional current priority values, each associated with another one of the two or more different layers managed by the controller, and includes the additional current priority values within the priority information.

Embodiments of the present invention further provide a data network including a network management node coupled to the data network to identify priority errors within the data network and an intermediate network node coupled to receive a priority trace data packet originated at an originating node of interest in the data network and terminated at a terminating node of interest in the data network, in which the priority trace data packet has a priority field includes a current priority value. The intermediate network node determines a new priority value for the priority trace data packet and priority information including the current priority value associated with the priority trace data packet, and produces a priority trace field including the priority information for transmission thereof over the data network. The data network provides the priority trace field to the network management node for use by the network management node in identifying the priority errors.

In one embodiment, the intermediate network node further populates the new priority value within the priority field to produce a modified priority trace data packet and appends the priority trace field thereto. The intermediate network node further transmits the modified priority trace data packet over the data network to one or more additional intermediate network nodes.

In a further embodiment, at least one of the one or more additional intermediate network nodes is a non-enabled network node coupled to the data network to receive the priority trace data packet. The non-enabled network node forwards the priority trace data packet without modifying the priority information.

Embodiments of the present invention further provide a method for identifying priority errors within a data network. The method includes receiving a priority trace packet at an intermediate network node along a data path within the data network, in which the data path extends from an originating network node to a terminating network node, and inspecting the priority trace packet to identify a current priority value of the priority trace packet received at the intermediate network node. The method further includes storing the current priority value in a priority trace field and providing the priority trace field to a network management node for use in identifying priority errors along the data path.

BRIEF DESCRIPTION OF THE DRAWINGS

A more complete understanding of the present invention may be obtained by reference to the following detailed description when taken in conjunction with the accompanying drawings wherein:

FIG. 8 illustrates another exemplary priority trace data packet indicating an error along the data path, in accordance with embodiment of the present invention; and FIG. 9 is a flow chart illustrating an exemplary process for identifying priority errors within a data network using an in-band priority trace, in accordance with embodiments of the present invention.

DETAILED DESCRIPTION OF THE DRAWINGS

The present invention provides an in-band priority test that uses a priorityTrace request message to collect and accumulate priority information at every hop along a data path of the priorityTrace request message for diagnostic and/or troubleshooting purposes. For example, the resulting collected priority information can be used to identify one or more priority errors and sources of these priority errors in the telecommunication network. In an exemplary scenario, if a customer complains of excessive delays in data traffic sent from or to the customer, the network operator can release a priorityTrace request message into the network that will travel along the same data path(s) as the delayed data traffic to determine if there are any priority configuration errors in the data path(s). The in-band priority test works for both unicast and multicast data paths. In the multicast case, the priorityTrace request message is replicated normally according to the local multicast forwarding rules.

Figure 1:
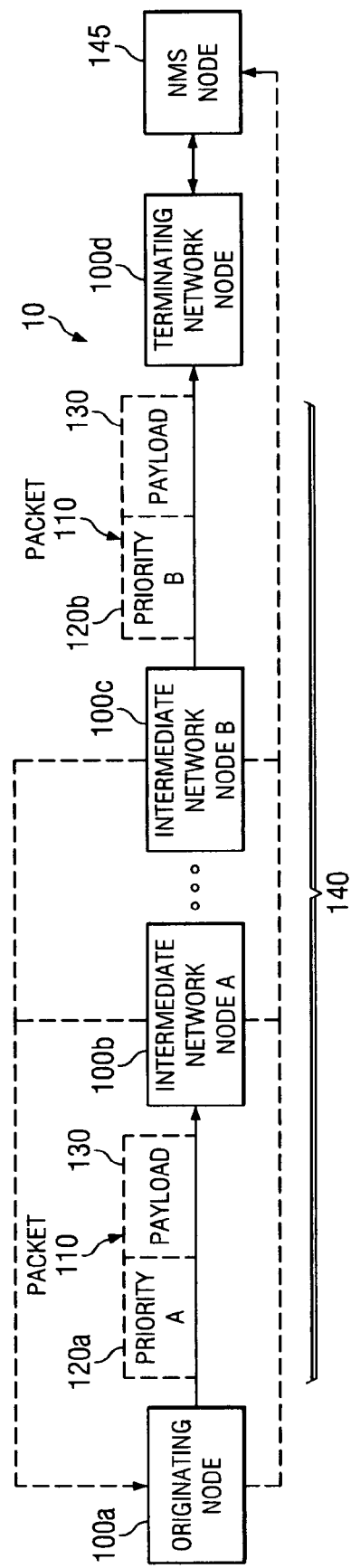
FIG. 1 illustrates an exemplary telecommunication network for implementing an in-band priority trace, in accordance with embodiments of the present invention.

Referring now to FIG. 1, there is illustrated an exemplary telecommunication network 10 configured to implement such an in-band test priority test, in accordance with embodiments of the present invention. The telecommunication network 10 includes a plurality of network nodes 100 and a network management system (NMS) node 145. An originating network node 100a generates the priorityTrace request message as a priority trace data packet 110 for transmission to a terminating network node 100d. The priority trace data packet 110 generated by the originating network node 100a includes an initial priority value (Priority A) in the packet header 120 and a payload 130. The priority trace data packet 110 is transmitted from the originating node 100a to the terminating node 100d along a data path 140 including one or more intermediate nodes (e.g., nodes 100b and 100c).

Each intermediate node 100b and 100c terminates the priority trace data packet 110 in the control plane, where the current packet headers are inspected, and the priority values of all the current network layers are determined. Thus, the priority information collected is based on the actual priority values of the priority trace data packet 110 itself, not on MIB readings. In addition, each intermediate node 100b and 100c processes the priority trace data packet 110 using internal priority tables to determine a new priority value 120b for the priority trace data packet 110 and populates the new priority value 120b within the priority trace data packet 110 prior to forwarding (or routing) the priority trace data packet 110 to the next network node along the data path 140.

In one exemplary embodiment, each intermediate node 100b and 100c stores the collected priority information in the payload 130 of the priority trace data packet, and the NMS node 145 retrieves the priority trace data packet 110 from the terminating node 100d to analyze the priorityTrace results (i.e., the collected priority information in the payload 130) and identify any priority errors along the data path 140. For multicast priorityTrace requests, the NMS 145 has the additional task of collecting the priorityTrace results from all of the reached destinations, instead of from just one destination in the unicast case.

In another exemplary embodiment, each intermediate node 100b and 100c forwards the priority information directly to the NMS node 145 via the data network without storing any priority information in the payload 130 of the priority trace data packet 110. In yet another exemplary embodiment, each intermediate node 100b and 100c provides the priority information to the originating node 100a in a respective response message to the originating node 100a without storing any priority information in the payload 130 of the priority trace data packet 110. In this embodiment, the NMS node 145 retrieves all of the priority information sent from each of the intermediate nodes 100b and 100c from the originating node 100a.

Upon review of the collected priority information, the NMS node 145 may determine that an error in priority settings occurred in one or more network nodes 100a-100d along the data path 140. For example, the NMS may determine that the priority value (Priority B) assigned to the data packet 110 by intermediate node 100c was incorrect. With this information, the network operator can use out-of-band queries to determine the cause of the priority errors in each of the identified network nodes (e.g., node 100c).

Figure 2:
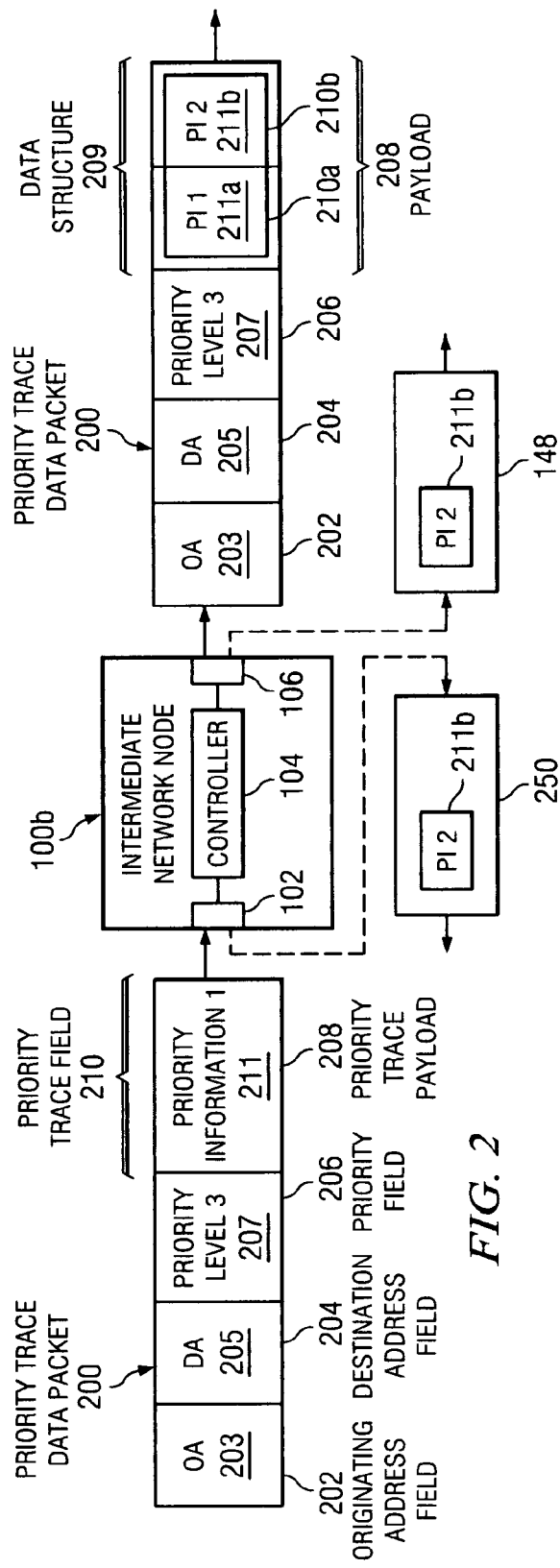
FIG. 2 illustrates an exemplary network node for processing a priority trace data packet providing an in-band priority trace, in accordance with embodiments of the present invention.

FIG. 2 illustrates an exemplary intermediate network node 100b for processing a priority trace data packet 200 (which corresponds to the priority trace data packet 110 shown in FIG. 1), thereby providing an in-band priority trace, in accordance with embodiments of the present invention. The intermediate network node 100b shown in FIG. 2 includes an ingress port 102 coupled to receive the priority trace data packet 200 from the data network, an egress port 106 coupled to transmit the priority trace data packet 200 from the network node 100b over the data network and a controller 104 for processing the received priority trace data packet 200.

As used herein, the term "controller" means any device, system or part thereof that controls at least one operation described herein, and that can be implemented in hardware, software, firmware, or some combination of the above. It should be noted that the functionality associated with the controller may be centralized or distributed, whether locally or remotely. For example, the controller may be a processor device that drives a general-purpose computer. It is noted, however, that other processing circuitry and/or processing devices, such as microcontrollers, Field Programmable Gate Arrays (FPGAs), or Application Specific Integrated Circuits (ASICs), or a combination thereof, can be used as well to perform the operations and achieve the results and/or benefits described herein.

As shown in FIG. 2, the priority trace data packet 200 includes an originating address field 202, a destination address field 204 and a priority field 206 in the packet header and a priority trace field 210 in the priority trace payload 208 that maintains the priority information 211 collected along the data path over which the priority trace data packet travels. The originating address (OA) 203 associated with the network node that originated the priority trace data packet is populated in the originating address field 202, the destination address (DA) 205 associated with the terminating network node of the priority trace data packet is populated in the destination address field 204 and the priority value (e.g., Priority Level 3) 207 of the priority trace data packet 200 is populated in the priority field 206.

The inbound priority trace data packet 200 received by the ingress port 102 of the network node 100b is passed to the controller 104 for processing and further routing of the priority trace data packet 200 via the egress port 106. More specifically, the controller 104 terminates the packet 200 in the control plane to inspect the current packet headers, including the current priority value (Priority Level 3) 207 assigned to the packet 200. The controller 104 can inspect the current packet headers in a single network layer (e.g., just IP) or in multiple network layers (e.g., IP, Ethernet, MPLS and/or any other packet network layer). For example, in one embodiment, when the packet headers in other network layers are available just before termination/decapsulation of the packet 200, the controller 104 may be able to view and collect the priority values from the other layers that terminate at the network node 100b. In another embodiment, the controller 104 interworks between the different transport protocols (e.g., IP, Ethernet and/or MPLS) of the network layers to retrieve the priority values from each of the network layers. In an exemplary embodiment, the priority values include one or more of Ethernet P-bits, Internet Protocol (IP) DSCP bits and/or MPLS EXP bits.

The controller 200 further saves the current priority value (s) (Priority Level 3) 207 of the received priority trace data packet 200 as new priority information (PI 2) 211b in the priority trace payload 208. The new priority information 211b includes the exemplary Ethernet P-bits, Internet Protocol (IP) DSCP bits and/or MPLS EXP bits retrieved by the controller 104 from the inbound priority trace data packet 200. In an exemplary embodiment, the controller 104 creates a new priority trace field 211b, stores the new priority information (PI 2) 211b in the new priority trace field 211b and appends the new priority trace field 211b to one or more existing priority trace fields (e.g., field 211a) that were previously created and appended by previous network nodes along the data path.

As a result, the priority trace payload 208 of the priority trace data packet 200 maintains the priority value(s) assigned to the priority trace data packet 200 by each node along the data path. For example, as shown in FIG. 2, the inbound priority trace data packet 200 received at the ingress port 102 of the network node 100b includes first priority information (PI 1) 211a stored in a first priority trace field 210a, while the outbound priority trace data packet 200 output by the egress port 106 of the network node 100b includes both the first priority information 211a stored in the first priority trace field 210a and second priority information (PI 2) 211b stored in a second priority trace field 210b.

In another embodiment, as shown in FIG. 2, instead of appending the priority information 211b to the priority trace data packet 200, the controller 104 encapsulates the priority information 211b into an additional data packet 148 having a destination address associated with the NMS node (shown in FIG. 1). In this embodiment, the egress port 106, which may be a special management port different from a data egress port, including the particular egress port used for the data path, is coupled to the data network to transmit the additional data packet 148 directly to the NMS node.

In yet another embodiment, as also shown in FIG. 2, instead of appending the priority information 211b to the priority trace data packet 200, the controller 104 generates a response message 250 to the originating node 100a and transmits the priority information 211b within the response message 250 to the originating node 100a via the ingress port 102 or another port for subsequent transmission of the priority information 211b by the originating node 100a to the network management node.

Regardless of how the new priority trace field is handled, the controller 104 also accesses internal priority tables to determine a new priority value (Priority Level 3) 207 for the priority trace data packet 200 and populates the new priority value (Priority Level 3) 207 in the priority field 206 of the outbound priority trace data packet 200. The priority value (Priority Level 3) assigned to the priority trace data packet 200 by the network node 100b will be retrieved by the next intermediate network node that receives the outbound priority trace data packet 200 for either appending to the priority trace data packet 200, forwarding directly to the NMS node or sending back to the originating node for subsequent transmission to the NMS node. Subsequent intermediate network nodes along the data path will also operate in a similar manner.

In an exemplary embodiment, the priority trace data packet 200 is built on existing in-band Operations, Administration and Maintenance (OAM) tools, such as ICMP Ping, LSP Ping, Traceroute, Ethernet 802.1ag LoopBack or LinkTrace. Each of these standardized OAM tools can accommodate the addition of new blocks of information, known as TLVs (Type, Length, Value), that can be used to store the collected priority information.

Therefore, in this embodiment, with reference again to FIG. 2 the priority trace data packet 200 can be implemented as an OAM packet/frame and the priority trace fields 210 can be implemented using TLVs. The TLVs can be vendor-proprietary, or standardized. In addition, the ping-like mechanisms can be two-way or can be restricted to one-way by the terminating node to test only one direction. Likewise, optimizations can be designed for traceroute-like mechanisms to avoid sending too many messages (for instance, multiple messages with increasing TTL) and replies. In another embodiment, an Echo-like OAM message could be used as a one-way non-replicated message.

Figure 3:
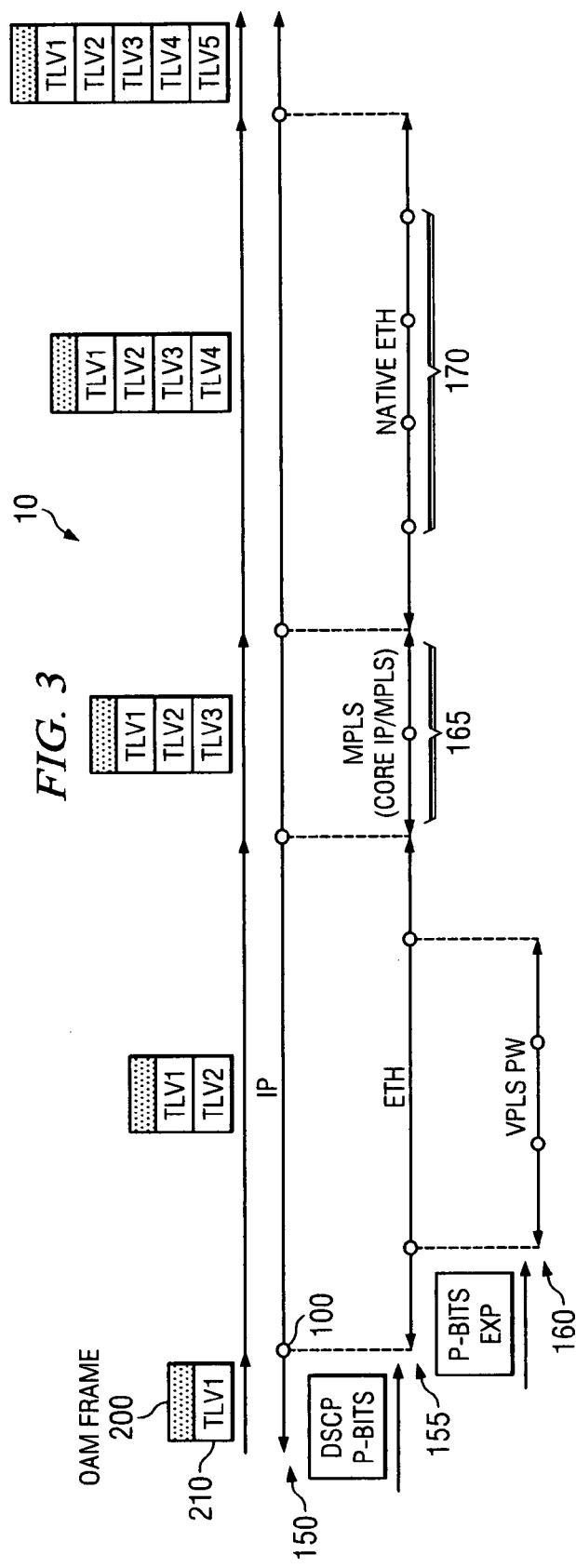
FIG. 3 illustrates an exemplary data path of a priority trace data packet, in accordance with embodiments of the present invention.

An exemplary data path of a priority trace data packet over a telecommunication network 10 is shown in FIG. 3. An end-to-end IP 150 path is shown, which is transported on Ethernet 155 emulated over VPLS 160 (left side), then on an MPLS core network 165 (middle), and on native Ethernet 170 (right side). A few of the per-packet priority modifications are shown, such as a mapping of IP DSCP bits into Ethernet p-bits and a mapping of Ethernet p-bits into a VPLS pseudo-wire (EXP) instantiated as a pair of MPLS LSPs, or an Ethernet priority regeneration.

FIG. 3 illustrates a single-layer implementation of the priorityTrace request. The priority trace data packet 200 is shown implemented as an OAM frame with the priority information stored in appended TLVs, corresponding to the priority trace fields 210 of FIG. 2. The TLVs 210 are added only by IP nodes 100. In this example, there are five TLVs 210 (i.e., TLV1, TLV2, TLV3, TLV4 and TLV5) upon completion of the priorityTrace, showing five network (IP) segments. Thus, the first IP node 100 receives the OAM frame 200 with one TLV 210 (TLV1) containing priority information of the previous IP segment (i.e., the priority value of the OAM frame as it entered the previous IP node in the data path). This first IP node retrieves the current priority value assigned to the OAM frame, stores this current priority value in a second TLV 210 (TLV2) and appends TLV2 to TLV1. The second IP node receives the OAM frame containing both TLV1 and TLV2, retrieves the current priority level assigned to the OAM frame and appends this current priority value in a third TLV 210 (TLV3). The third IP node receives the OAM frame containing TLV1, TLV2 and TLV3, retrieves the current priority level assigned to the OAM frame and appends this current priority value in a fourth TLV 210 (TLV4). Finally, the fourth IP node receives the OAM frame containing TLV1, TLV2, TLV3 and TLV24 retrieves the current priority level assigned to the OAM frame and appends this current priority value in a fifth TLV 210 (TLV5).

Figure 4:
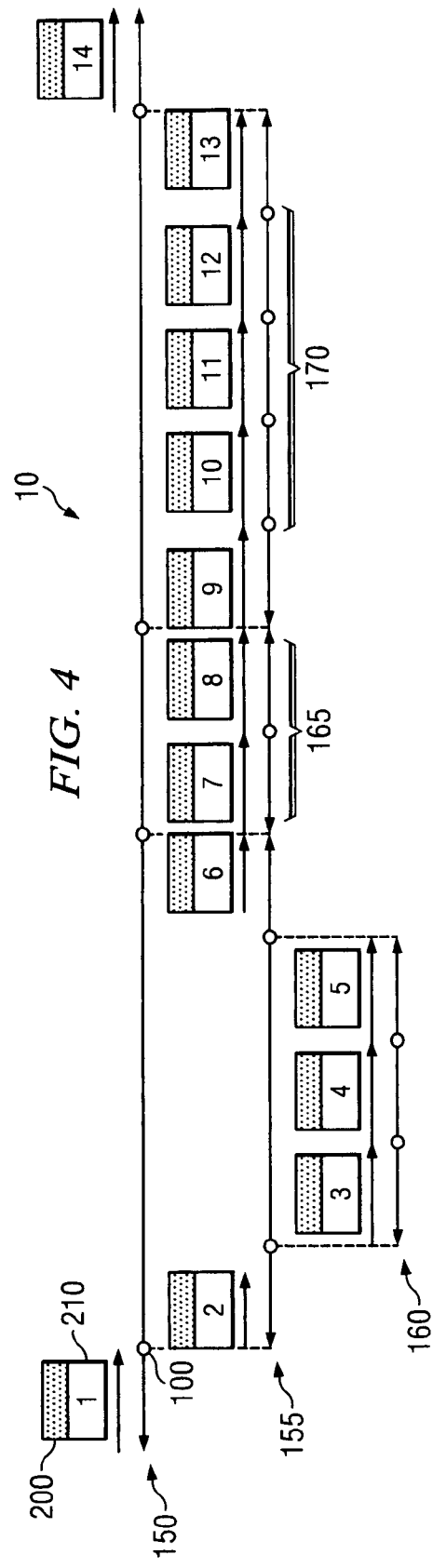
FIG. 4 illustrates another exemplary data path of a priority trace data packet involving multiple network layers, in accordance with embodiments of the present invention.

A multi-layer implementation example is shown in FIG. 4. The data path shown in FIG. 4 is identical to the data path shown in FIG. 3, however, the priorityTrace TLVs 210 are added by nodes 100 at multiple layers, and the OAM mechanisms are adapted at each encapsulation/decapsulation. The priorityTrace payload (existing) TLVs 210 are carried between layers without changes. In this example, there are fourteen TLVs 210 upon completion of the priorityTrace, showing fourteen network segments (a mix of IP, Ethernet, VPLS, and MPLS layers).

Figure 5:
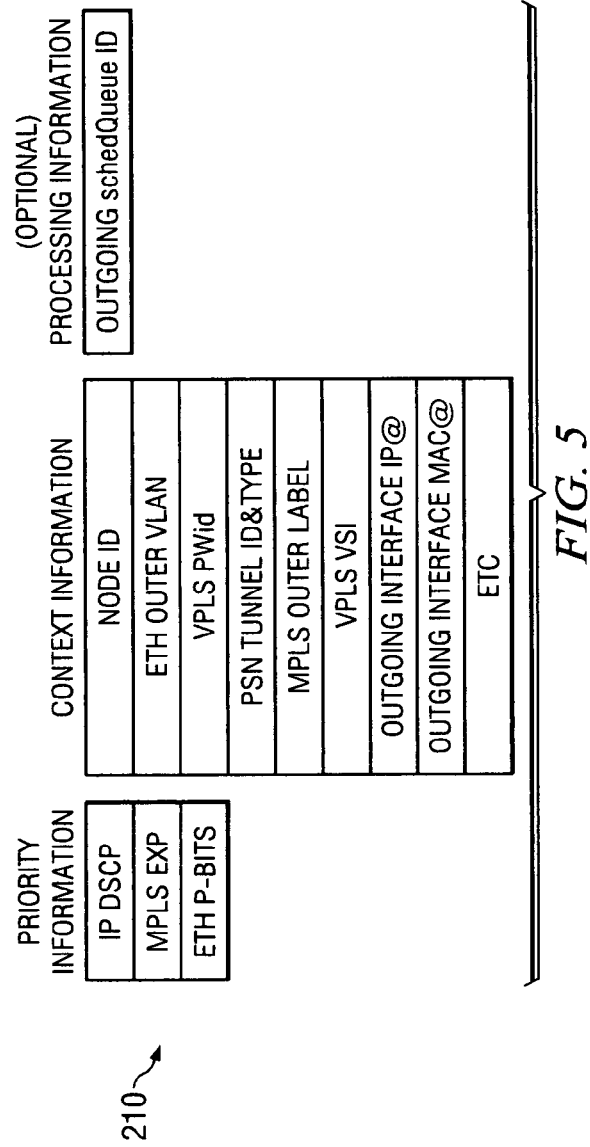
FIG. 5 illustrates an exemplary data structure of a priority trace data packet, in accordance with embodiments of the present invention.

FIG. 5 illustrates an exemplary data structure of a priorityTrace TLV 210. The data structure includes priority information (e.g., the actual priority bits retrieved from the OAM packet/frame headers), various context information associated with the data path (e.g., node ID, VLAN ID, PW ID, PSN tunnel id and type, MPLS outer label, VPLS instance, etc.), and optional processing information. For example, the processing information can include the Queue-Id (used for traffic scheduling in nodes), in order to verify not only the priority given to a packet/frame, but also the processing it experiences along the data path.

The in-band priority test described herein operates in heterogeneous networks, with enabled nodes capable of processing the priority trace data packet and non-enabled nodes that are not capable of processing the priority trace data packet. For example, referring now to FIG. 6, if an intermediate node does not implement the priority trace in-band test, that non-enabled node will simply forward the basic OAM packet/frame and ignore the priorityTrace content. More specifically, non-enabled nodes will simply process the priorityTrace request message as the ping-like or traceroute-like message it is built on, and forward it normally (possibly modifying the priorities, but without recording this in a TLV).

Figure 6:
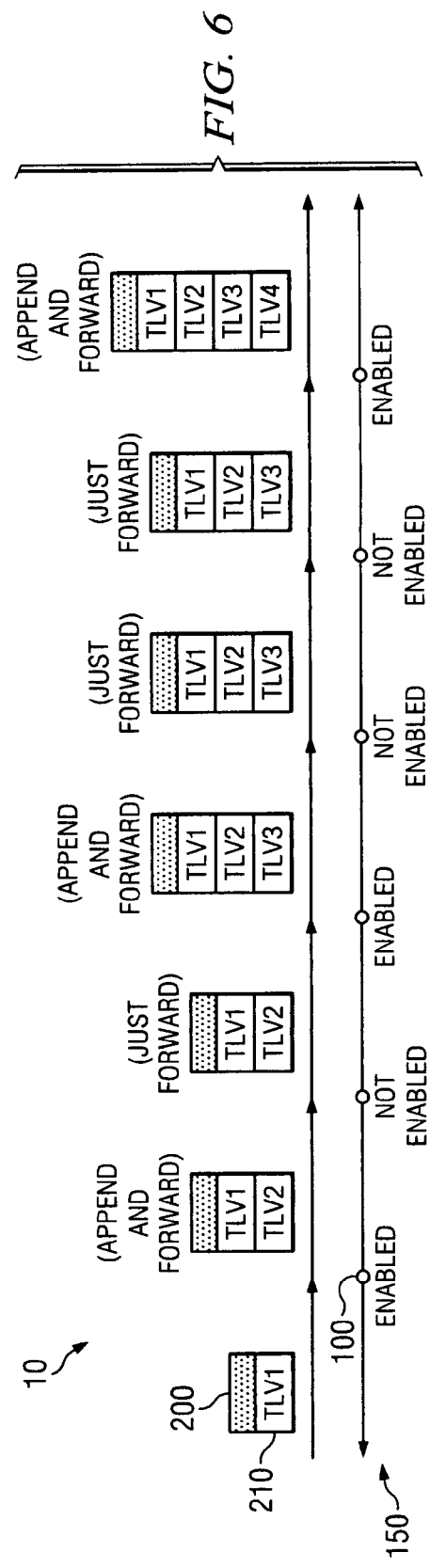
FIG. 6 illustrates an exemplary non-enabled data path of a priority trace data packet, in accordance with embodiments of the present invention.

Thus, as can be seen in FIG. 6, the first node 100 shown is an enabled node that receives the OAM frame 200 with TLV1 210, processes the OAM frame 200 to determine the current priority assigned to the OAM frame 200 and appends the current priority to the OAM frame in a new TLV (TLV2). In other embodiments, as described above, TLV2 can be sent directly to the network management node or back to the originating node for subsequent forwarding to the network management node. Referring again to FIG. 6, the second node 100 shown is a non-enabled node that simply forwards the OAM frame 200 without appending any new priority information to the OAM frame. Therefore, the OAM frame 200 received at the third node includes only TLV1 and TLV2.

Although pinpointing problems with non-enabled nodes in the data path is still possible (i.e., by locating particular segments with errors, where segments are delimited by enabled nodes), the accuracy of the pinpoint is reduced compared to data paths containing only enabled nodes. Therefore, the more enabled nodes along the path, the more accurate the in-band test.

Figure 7:
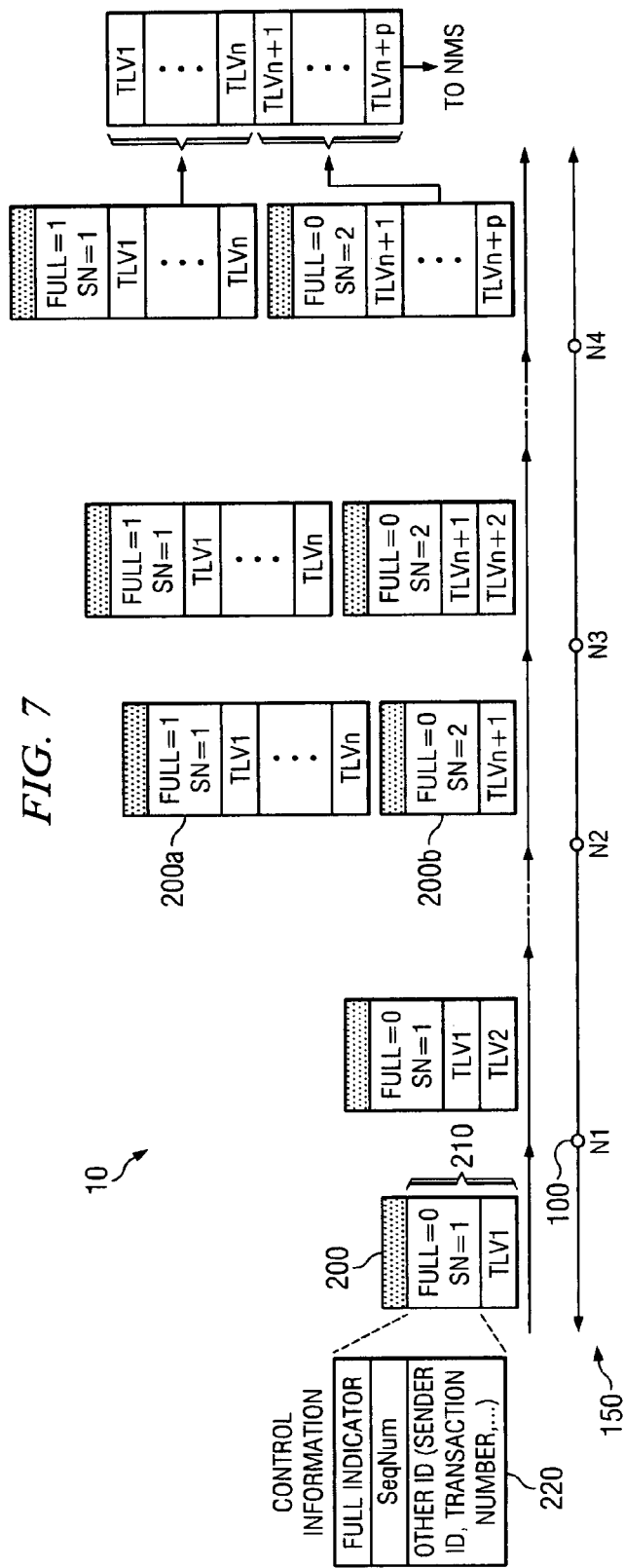
FIG. 7 illustrates an exemplary priority trace data packet including control information for controlling the generation of additional priority trace data packets, in accordance with embodiments of the present invention.

Referring now to FIG. 7, to identify the message as a priorityTrace request and to distinguish between many priorityTrace requests, a utility TLV (control TLV) 210 is added at the beginning of the priority trace payload. The control TLV 210 includes control information 220 that is used to identify the priorityTrace request, and to help resolve the case of the OAM packet/frame size exceeding the MTU (Maximum Transmission Unit) of a layer. Thus, the control TLV 210 is useful in the case of a very long data path resulting in a large number of appended TLVs, which could lead to the OAM frame size exceeding the size of the MTU.

The control information 220 shown in FIG. 7 includes two additional indicators: a "Full" indicator, and a "Sequence Number." The "Full" bit indicates the inability of the current OAM frame 200a to hold an additional TLV 210. For example, after adding a TLV, if the control plane notices that there is not enough room for another TLV, the control plane creates a new OAM frame 200b by copying only the control information from the old OAM frame 200a (without the TLVs) and marks the old OAM frame 200a as "Full". To create the new OAM frame 200b, the control information 220 also includes information enabling the generation of the new OAM frame 200b for the priorityTrace request upon the indication that the current OAM frame 200a is full.

A priorityTrace OAM packet/frame 200a marked as Full is simply forwarded, without modification. The newly created OAM frame 200b is distinguished from the previous OAM frame 200a with an incremented Sequence Number value. Thus, the control information 220 further includes information for assigning a next sequence number following the current sequence number to the new OAM frame 200b. FIG. 7 illustrates a case where a second priorityTrace OAM frame 200b is spawned at node N2.

The final receiver(s), i.e., the unicast destination or multicast listeners, may receive several priorityTrace OAM frames 200a and 200b, each including multiple TLVs. The TLVs from all of the OAM frames 200a and 200b can be put back together in the proper sequence using the assigned sequence numbers of the OAM frames 200a and 200b.

FIG. 8 illustrates a usage example, in which an Ethernet priority regeneration table is misconfigured, which has a side effect on the IP priority. By error 300, Ethernet priority 4 is changed into priority 0 in node 4, where the transport VLAN is terminated. Node 4 also happens to be configured to reset the IP priority according to the Ethernet priority. Therefore, an original IP priority 4 data packet will continue along the data path with priority 0 due to the misconfiguration in node 4. If a customer complains about the low priority, the network operator can quickly pinpoint the source of the problem by running a priorityTrace, which would include the information 310 necessary to identify node 4 as the source of the problem, between Ethernet and IP layers.

FIG. 9 is a flowchart illustrating an exemplary process 400 for identifying priority errors within a data network using an in-band priority trace, in accordance with embodiments of the present invention. Initially, at blocks 405 and 410, a priority trace request is transmitted from an originating network node in a priority trace packet with an assigned priority through a data network and received at an intermediate network node along a data path over which the priority trace packet travels.

If, at block 415, it is determined that the intermediate network node is not enabled to handle priority trace requests, the non-enabled intermediate network node forwards priority trace packet along the data path to additional intermediate network nodes, as determined at block 435, without processing the priority trace request. However, if the intermediate network node is enabled to handle priority trace requests, at block 420, the intermediate network node inspects the priority trace packet to identify a current priority value of the priority trace packet received at the intermediate network node. In addition, at block 425, the intermediate network node stores the current priority value in a new priority trace field generated by the intermediate network node, and at block 430, transmits the new priority trace field to a network management node.

In one embodiment, the new priority trace field is appended to previous priority trace fields maintaining previous priority values determined by previous network nodes in the data path, and the list of appended priority trace fields is forwarded to the network management node through the data path via any subsequent intermediate network nodes and the terminating network node. In another embodiment, the new priority trace field is transmitted directly to the network management node from the intermediate network node. In yet another embodiment, the priority trace field is transmitted back to the originating node, which forwards the priority trace field to the network management node, along with all of the other priority trace fields sent back to the originating node by other intermediate network nodes in the data path.

If there are additional intermediate network nodes in the data path, as determined at block 435, the priority trace packet is forwarded to the next intermediate network node in the data path. In embodiments in which the new priority trace field is appended to previous priority trace fields, the priority trace packet sent to the next intermediate network node includes all of the appended priority trace fields. For each additional node in the data path, the priority trace packet is received at block 410, and for each enabled node, as determined at block 415, the packet is inspected at block 420 and the current priority is value is stored in a new priority trace field, at block 425. In addition, at block 430, each new priority trace field is transmitted to the network management node either directly or indirectly as an appended priority trace field or via the originating node of the priority trace packet, as described above. The priority information included in all of the priority trace fields generated by the intermediate network nodes in the data path are collected, put back in the correct order and analyzed by network management node, at block 440, to identify priority errors and the sources of such errors along the data path.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A method for forming a priority trace data packet, comprising:
   determining an origination address identifying an originating node within a data network that originated the priority trace data packet;
   determining a destination address identifying a terminating node for the priority trace data packet within the data network;
   determining a current priority previously assigned to the priority trace data packet, the current priority including a separate layer priority value for each network layer of the priority trace data packet;
   determining a new priority for the priority trace data packet, the new priority including a new separate layer priority value for each network layer of the priority trace data packet;
   populating the origination address, the destination address and the new priority value within the priority trace data packet; and
   providing a payload for collecting and maintaining priority information that indicates respective actual priority values assigned to each network layer of the priority trace data packet by each priority trace enabled network node within the data network that is in a data path between the originating node and the terminating node, the priority information including the current priority.

2. The method of claim 1, wherein the destination address is one of a unicast address or a multicast address.

3. The method of claim 1, wherein the priority information is arranged in a data structure such that each of the actual priority values is contained within a separate priority trace field.

4. The method of claim 3, wherein the priority trace data packet is an Operations, Administration and Maintenance (OAM) packet and the data structure includes one or more Type, Length, Value (TLV) fields appended to the priority trace data packet, each containing one of the actual priority values assigned to the priority trace data packet by the respective priority trace enabled network node.

5. The method of claim 3, wherein the one or more priority trace fields includes a control field containing control information for controlling the priority trace data packet.

6. The method of claim 5, wherein the priority trace data packet is an original priority trace data packet, and wherein the control information includes a full indicator indicating whether the original priority trace data packet is full and an original sequence number associated with the original priority trace data packet identifying the original priority trace packet within a sequence of priority trace data packets that collectively contain the priority information for the original priority trace data packet.

7. The method of claim 6, wherein the full indicator is set to full when a size of the original priority trace data packet is substantially equal to a maximum transmission unit (MTU) associated with the original priority trace data packet.

8. The method of claim 6, wherein the control information further includes:
   information enabling the generation of a next priority trace data packet upon the indication that the original priority data packet is full; and
   information for assigning a next sequence number following the original sequence number to the next priority trace data packet;

and wherein:
each of the priority trace data packets within the sequence thereof includes the control information to enable generation of subsequent priority trace data packets and assignment of subsequent sequence numbers to the subsequent priority trace data packets.

9. The method of claim 1, wherein the priority information includes one or more of Ethernet P-bits, Internet Protocol (IP) DSCP bits and MPLS EXP bits.

10. The method of claim 1, wherein the payload further includes a context field for collecting and maintaining context information associated with the data path.

11. The method of claim 10, wherein the payload further includes a processing field for collecting and maintaining processing information indicating the processing experienced by the priority trace data packet at each priority trace enabled network node.

12. The method of claim 11, wherein the processing information includes a respective queue identity of the priority trace data packet at each priority trace enabled network node.

13. A network node within a data network, comprising:
an ingress port coupled to the data network to receive a priority trace data packet originated at an originating node of interest in the data network and terminated at a terminating node of interest in the data network, the priority trace data packet having a priority field including a current priority, the current priority including a separate layer priority value for each network layer of the priority trace data packet; and
a controller coupled to process the priority trace data packet to determine a new priority for the priority trace data packet and priority information associated with the priority trace data packet, the new priority including a new separate layer priority value for each network layer of the priority trace data packet, the priority information including the current priority, wherein the controller is operable to produce a priority trace field including the priority information; and
an egress port coupled to the data network for transmission by the data network of the priority trace field to a network management node for use thereof in identifying priority errors within the data network.

14. The network node of claim 13, wherein:
the controller is further operable to populate the new priority within the priority field to produce a modified priority trace data packet and to append the priority trace field thereto; and
the egress port is coupled to transmit the modified priority trace data packet over the data network to one or more additional network nodes prior to transmission of the priority trace field to the network management node.

15. The network node of claim 14, wherein:
the priority trace data packet includes one or more additional priority trace fields appended thereto, each containing respective priority information including respective actual priority values assigned to each network layer of the priority trace data packet by other network nodes within the data network that previously received the priority trace data packet; and
the modified priority trace data packet includes the priority trace field appended to the additional priority trace fields.

16. The network node of claim 13, wherein:
the controller is operable to encapsulate the priority trace field into an additional data packet having a destination address associated with the network management node; and
the egress port is coupled to the data network to transmit the additional data packet to the network management node.

17. The network node of claim 13, wherein the controller is operable to:
generate a response message to the originating node; and
transmit the priority trace field within the response message to the originating node via the egress port for subsequent transmission of the priority trace field by the originating node to the network management node.

18. The network node of claim 13, wherein:
the priority trace data packet includes two or more different network layers;
each of the two or more different network layers is carried by a different transport protocol;
the controller is operable to interwork between the different transport protocols associated with the different network layers to retrieve the layer priority values, each associated with one of the two or more different network layers managed by the controller.

19. A data network, comprising:
a network management node coupled to the data network to identify priority errors within the data network; and
an intermediate network node coupled to receive a priority trace data packet originated at an originating node of interest in the data network and terminated at a terminating node of interest in the data network, the priority trace data packet having a priority field including a current priority, the current priority including a separate layer priority value for each network layer of the priority trace data packet;
wherein the intermediate network node is operable to determine a new priority for the priority trace data packet and priority information associated with the priority trace data packet, the new priority including a new separate layer priority value for each network layer of the priority trace data packet, the priority information including the current priority;
wherein the intermediate network node is operable to produce a priority trace field including the priority information and to transmit the priority trace field over the data network;
wherein the intermediate network node provides the priority trace field to the network management node for use by the network management node in identifying the priority errors.

20. The data network of claim 19, wherein the intermediate network node is further operable to:
populate the new priority within the priority field to produce a modified priority trace data packet and to append the priority trace field thereto; and
transmit the modified priority trace data packet over the data network to one or more additional intermediate network nodes.

21. The data network of claim 20, wherein at least one of the one or more additional intermediate network nodes is a non-enabled network node coupled to the data network to receive the priority trace data packet, the non-enabled network node operating to forward the priority trace data packet without modifying the priority information.

22. The data network of claim 20, wherein the modified priority trace data packet further includes one or more additional priority trace fields appended thereto, each containing respective priority information that contain respective actual priority values assigned to each network layer of the priority trace data packet by other intermediate network nodes within the data network that previously received the priority trace data packet.

23. The data network of claim 19, wherein the intermediate node is operable to generate a response message to the originating node and to transmit the priority trace field within the response message to the originating node for subsequent transmission of the priority trace field by the originating node to the network management node.

24. A method for identifying priority errors within a data network using an in-band priority trace, comprising the steps of:
- receiving a priority trace packet at an intermediate network node along a data path within the data network, the data path extending from an originating network node to a terminating network node;
- inspecting the priority trace packet to identify a current priority of the priority trace packet as received at the intermediate network node, the current priority including a separate layer priority value for each network layer of the priority trace data packet;
- storing the current priority in a priority trace field;
- providing the priority trace field to a network management node for use in identifying priority errors along the data path; and
- repeating the steps of receiving, inspecting, storing and providing at each priority trace enabled intermediate network node along the data path.

25. The method of claim 24, wherein said step of storing further comprises:
- determining a new priority for the priority trace data packet, the new priority including a new separate layer priority value for each network layer of the priority trace data packet;
- populating the new priority within the priority field to produce a modified priority trace data packet; and
- appending the priority trace field to the modified priority trace data packet; and wherein said step of providing further comprises:
- transmitting the modified priority trace data packet over the data network to a next intermediate network node in the data path for subsequent retrieval of the priority trace field by the network management node from the terminating network node in the data path.

26. The method of claim 24, wherein said step of providing further comprises:
- transmitting the priority trace field directly from the intermediate network node to the network management node via the data network.

27. The method of claim 24, wherein said step of providing further comprises:
- generating a response message to the originating network node; and
- transmitting the priority trace field within the response message to the originating network node for subsequent transmission of the priority trace field by the originating network node to the network management node.

\* \* \* \* \*